Dec. 23, 1969 W. J. TALLEY, JR 3,485,363
PLURAL DECK CENTER DISCHARGE SEPARATOR
Filed April 8, 1968 2 Sheets-Sheet 1
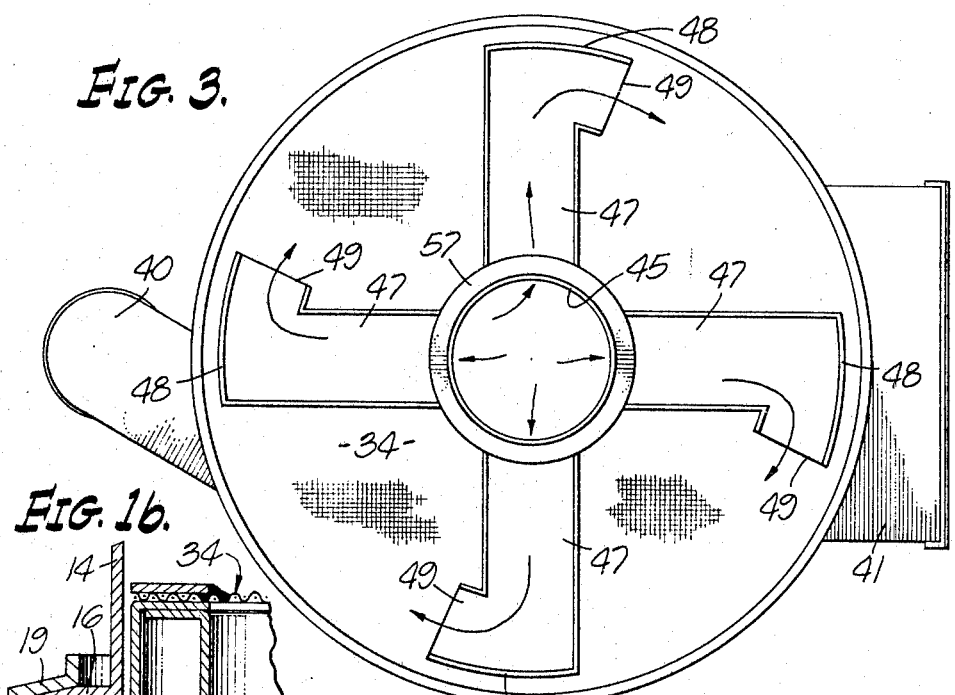
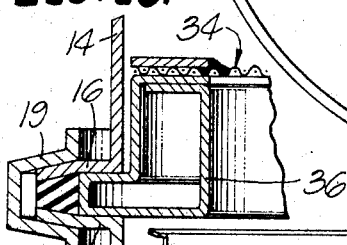
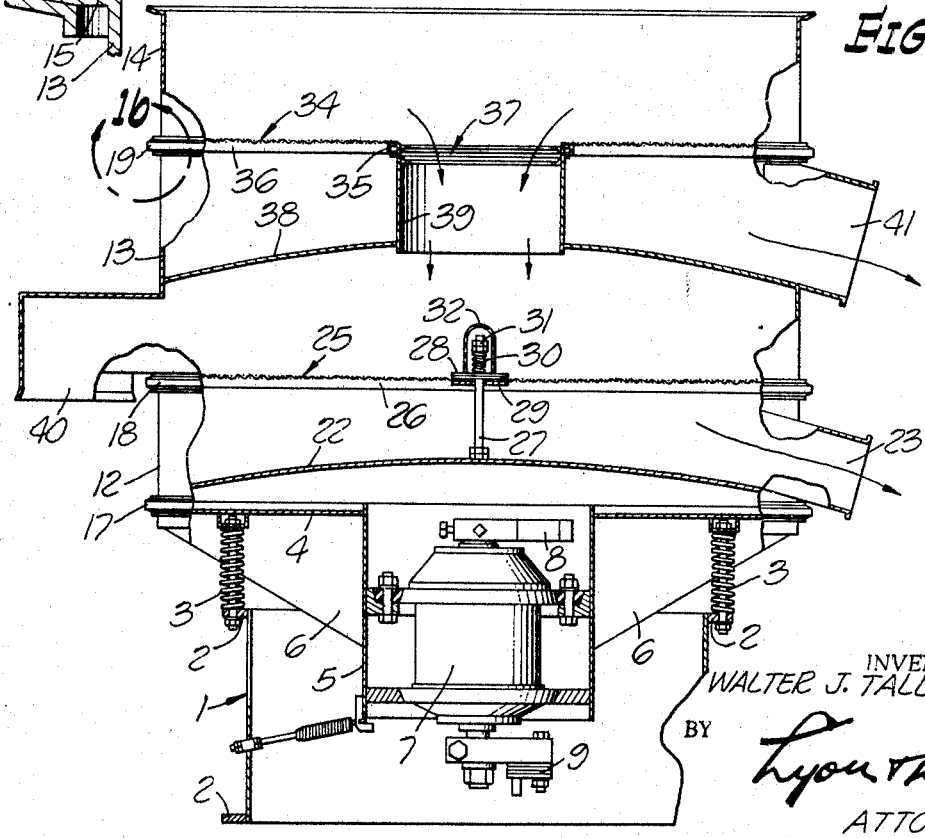
INVENTOR.
WALTER J. TALLEY, JR.
BY
Lyon & Lyon
ATTORNEYS Dec. 23, 1969  W. J. TALLEY, JR  3,485,363
PLURAL DECK CENTER DISCHARGE SEPARATOR
Filed April 8, 1968  2 Sheets-Sheet 2
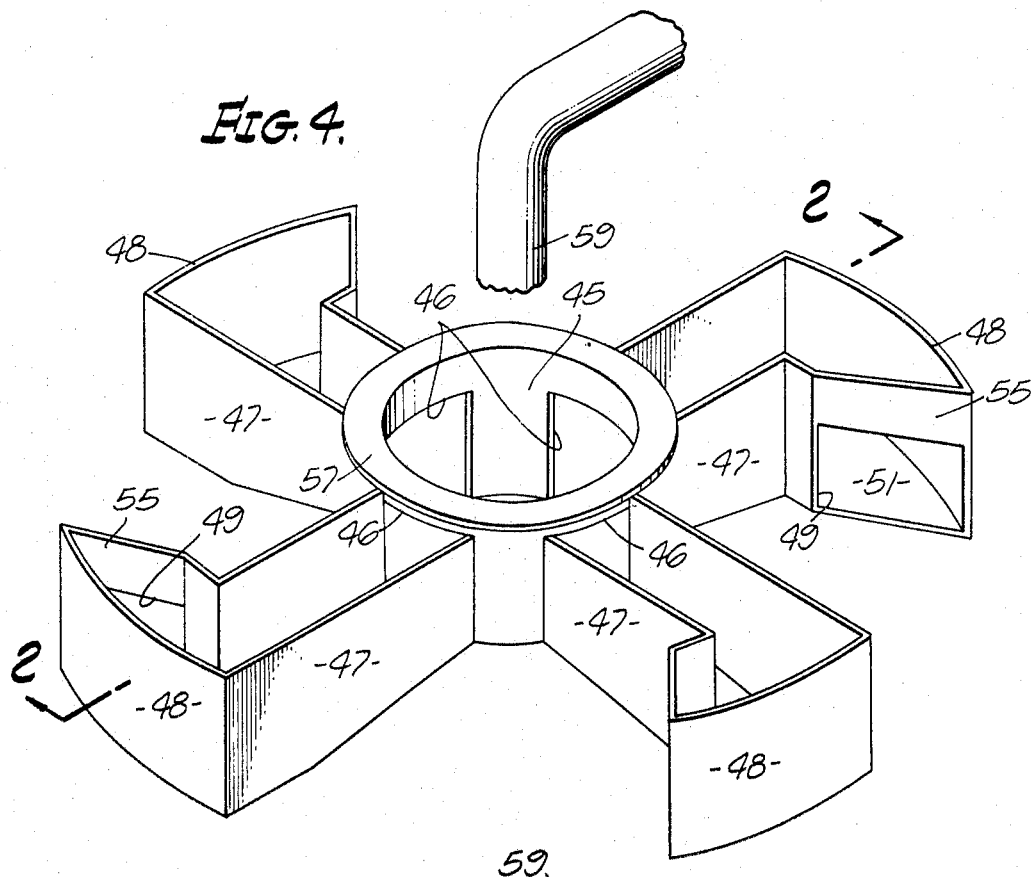
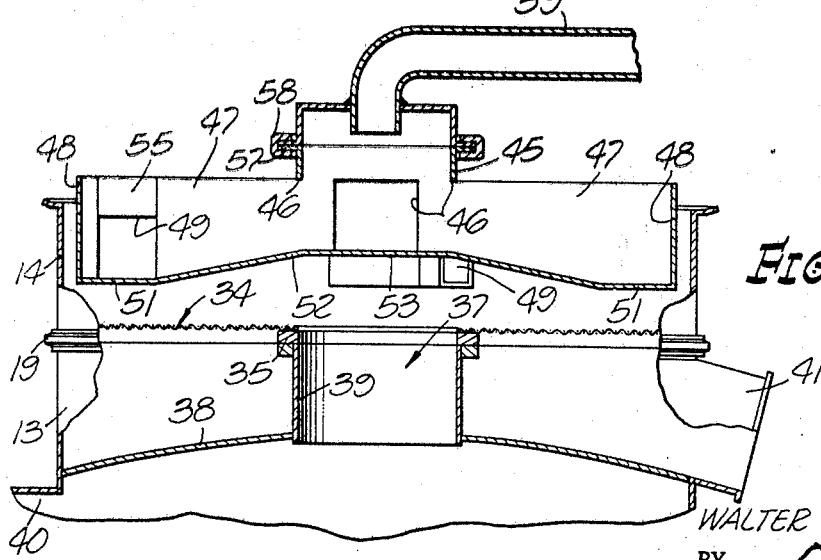
INVENTOR.
WALTER J. TALLEY, JR.
BY
*Lyon & Lyon*
ATTORNEYS United States Patent Office 3,485,363
Patented Dec. 23, 1969

3,485,363
PLURAL DECK CENTER DISCHARGE SEPARATOR
Walter J. Talley, Jr., Los Angeles, Calif., assignor to Sweco, Inc., Los Angeles, Calif., a corporation of California
Filed Apr. 8, 1968, Ser. No. 719,550
Int. Cl. B07b 1/40, 1/28
U.S. Cl. 209—240
5 Claims

ABSTRACT OF THE DISCLOSURE

A vibratory separator employing a plurality of separator screens mounted in a housing which is vibrated. An upper screen has a central discharge opening for allowing material fed thereto to flow to a lower screen. Material to be separated is fed to the periphery of the upper screen in a manner to cause a portion of the material to move to the central discharge opening thereof and be fed to the center of a lower screen.

---

This invention relates to vibratory separators, and more particularly to the type of vibratory separators employing screens therein, such as those disclosed in Meinzer Patent No. 2,284,671 and Miller et al. Patent Nos. 2,696,-302; 2,714,961; 2,753,999 and 2,777,578. Vibratory separators of this type utilize one or more screens and a vibrating means including eccentric weights which cause the screen or screens to vibrate or gyrate. Typically, the material to be separated is fed to the uppermost screen and is caused to spiral outwardly to the periphery of the screen as the same vibrates. Oversize material is discharged through a peripheral chute above a screen and undersize material falls onto a pan for discharge or onto a lower screen.

The screens may be stacked to increase capacity or to effect a more complete grading as to particle size. A variety of screen mesh sizes may be employed. The materials and mixtures which are to be separated may run the gamut of the manufacturing and processing industry. An arrangement which is suitable for one mixture may not be suitable for another; however, the operation of the separator can be adjusted for the specific material or mixture involved. One particular adjustment involves changing the relative angular positions, as well as the mass, of the eccentric weights employed to vibrate the separator. Angular adjustment, for example, affects the dwell time of the material by varying the path taken by the material or by varying the rate at which the material moves outwardly from the point of deposit to the periphery of the screen.

The apparatus of the present invention is an improvement on the vibratory separator described and claimed in application Ser. No. 597,359, filed Nov. 28, 1966, and assigned to the assignee of the present application, the disclosure of which is incorporated herein by reference. In said application a vibratory separator is disclosed wherein material to be separated is fed to the periphery of a separator screen, and the oversized components of said material are caused to progress from the periphery to the center of the screen and be discharged through a central opening therein.

It is an object of the present invention to provide an improved vibratory separator.

Another object of this invention is to provide a vibratory separator having improved capacity for separating components of a feed material.

An additional object of this invention is to provide a vibratory separator capable of efficiently handling material fed at a normal rate as well as surges of material.

A further object of this invention is to provide a separator having a plurality of separator screens wherein material to be separated is fed peripherally to an upper screen and centrally to a lower screen.

These and other objects and features of the present invention will become better understood through a consideration of the following description taken in conjunction with the drawings in which:

FIGURE 1a is an elevational cross-sectional view of an embodiment of a vibratory separator according to the present invention;

FIGURE 1b is a fragmentary view of a portion of the separator in FIGURE 1a;

FIGURE 2 is a partial view similar to FIGURE 1a illustrating the manner in which material is fed to an upper screen;

FIGURE 3 is a plan view of the separator and illustrates a suitable material feed arrangement for the upper screen; and FIGURE 4 is a perspective view of the feed arrangement.

Briefly, in accordance with the concepts of the present invention, a vibratory separator for separating components of a feed material is provided having two screens mounted one above the other. The upper screen has a central discharge opening. Material to be separated is fed to the periphery of the upper screen and a portion of the material passes through the central discharge opening thereof to the center of the lower screen. A separator of this nature is particularly useful for a liquid/solids separation wherein the upper screen removes a large portion of the liquid from the material, and then solids and a small amount of liquid passes through the central discharge opening to the center of the lower screen for further separation.

Turning now to the drawings, an exemplary separator apparatus according to the present invention is disclosed and includes a cylindrical base shell 1 having end flanges 2. The upper flange supports a plurality of upright springs 3, the ends of which are suitably attached, as with bolts, respectively to the upper flange and to the underside of a base plate 4. The base plate 4 is circular, and fitted centrally within the base plate is a cylindrical motor shell 5. Radial gussets 6 extend outwardly from the shell 5 and are secured, as by welding, to the underside of the base plate 4. A motor 7 is supported within the motor shell 5. The ends of the shaft of the motor 7 carry upper and lower eccentric weights 8 and 9 such that on rotation of the shaft of the motor 7 the base plate 4 is vibrated or shaken as set forth in the aforementioned Meinzer patent.

The base plate 4 supports a series of cylindrical sections, or spacing frames 12 through 14, each having at its axial extremities radially outwardly extending flanges, such as flanges 15 and 16 on respective sections 13 and 14 as seen in FIGURE 1b. The flanges of adjacent sections are engaged by clamp rings 17 through 19 to retain the various sections together. That is, the clamp ring 17 secures the section 12 to the base plate 4, the ring 18 secures the section 12 to the section 13, and the ring 19 secures the section 13 to the section 14.

Section 12 includes a discharge dome 22 which is in the form of an inverted pan, the periphery of which is welded to the interior wall of the secion 12, or includes a flange which is secured by the clamp ring 17. Section 12 also includes a discharge spout 23 communicating with the dome 22 for receiving undersized material which passes through a screen 25 to the upper surface of the dome.

The screen 25 is a conventional separator screen of desired mesh and has an outer tenson ring 26 which fits between the respective upper and lower flanges of sections 12 and 13 and is retained in poition by the clamp ring 18. A tension bolt 27 is secured to and projects upwardly from the center of the discharge dome 22, and extends through the center of the screen 25 which has a pair of washers 28 and 29 affixed to the center thereof. A spring 30 and nuts 31 are positioned on the upper end of the bolt 27, adjustment of the nuts 31 enabling the center of the screen 25 to draw downwardly for tensioning purposes. A flexible cover 32 may be provided over the upper end of the tension bolt. If desired to ensure proper movement of material from the center to the periphery of the screen 25, a reverse tension bolt arrangement may be employed wherein a nut and spring are secured on the bolt 27 below the screen 25 to press upwardly and thus tension the screen 25 upwardly slightly in the form of a cone. In this case the spring 30 above the screen is not needed.

A screen 34 is mounted between the respective sections 13 and 14. However, the screen 34 has both inner and outer tension rings 35 and 36, and has a central opening 37 therethrough. A discharge dome 38 underlies the screen 34, and a cylindrical dischareg spout 39 is secured to the inner tension ring 35 and to a central opening in the dome 38. The section 13 includes a discharge spout 40 for receiving oversize material from the top of the screen 25. A discharge spout 41 communicates with the dome 38 for discharging undersized material passing through the screen 34.

As noted earlier, material is fed to the periphery of the upper screen 34. A suitable feed arrangement is illustrated in FIGURES 2 through 4 and is described in said aforementioned application Ser. No. 597,359, although other feed arrangements may be used for providing a peripheral feed to the screen 34. Considering the arrangement shown, a cylindrical member 45 is provided with four evenly spaced peripheral openings 46 from each of which a trough-shaped arm 47 extends radially toward the periphery of the screen 34. At the outermost end of the radially extending troughs 47, the troughs while retaining their basic dimensions, turn with a curvature complementary to the curvature of the spacing frame 14 to form curved troughs 48. The outer wall of the troughs 48 is generally a segment of a circle concentric with the frame 14. At the end of the curved troughs 48 is an opening 49 from which material to be separated may flow. The base 51 of the curved troughs 38 is on a lower horizontal plane than the base 52 of the radial troughs 47 which, in turn, are lower than the base 53 of the cylindrical member 45. The bases 51 and 52 may slope generally downward toward the openings 46 to facilitate the flow of material from the member 45 to the curved troughs 48. Across the upper portions of the mouth of the curved troughs 48 are baffle plates 55 which function to ensure a relatively even flow of material from the openings 49. A circular flange 57 is provided for structural stability and for enabling the feed ararngement to be coupled by a clamp ring 58 to a feed pipe 59. The cylindrical member 45, troughs 47 and 48 may be open as shown to ensure easy access for cleaning purposes, or may be closed if desired.

The feed material consisting of liquid, solids, or semisolids is fed to the cylindrical member 45 by the feed pipe 59. Materials entering the cylindrical member 45 disperse through the four openings 46, flow down the radially extending trough arms 47 and curved troughs 48, and are ultimately projected from the openings 49. The curved troughs 48 are curved so that material flowing from the openings 49 is forcefully distributed around the periphery of the screen 34 in a generally tangential or non-radial direction. Other feed arrangements can be provided such as one or more feed pipes set at predetermined locations about the periphery of the frame 14, and extending therethrough so that the material flows into the frame in a generally tangential fashion. The feed arrangement results in a cyclonic or whirling effect which causes the material to initially develop a desired circular component of velocity required for efficient movement of the material toward the center of the screen 34.

The separator is principally useful for liquid/solids separation wherein solids are discharged at 40 and liquid is discharged at 23 and 41. The outlets 23 and 41 may be interconnected if desired to provide a single liquid outlet. With a separator according to the present invention, a uniform feed of material is not necessary and surges thereof can be readily accommodated without liquid flooding through the discharge duct 40. The action on the lower screen 25 is conventional with the eccentric weights being set to cause material to move from the center of the screen toward the periphery thereof for ultimate discharge of oversize material through the spout 40. Typically, material fed to the upper screen 34 also would tend to move toward the periphery thereof. However, it is believed that the upper screen 34 is closer to the null point of the vibratory source (the motor 7 and weights 8 and 9), and that the null point is above the screen 34 such that the forces tending to move the material toward the periphery of the upper screen 34 are less than the forces at the lower screen 25. This arrangement makes it easier for liquid forces to propel the feed material toward the center of the upper screen 34. Thus, it appears that the discharge of solid material from the upper screen 34 is principally dependent upon the sweeping effect of large volumes of fluid from the peripheral feed arrangement. If the fluid input is small, solid material may build up on the screen 34 and fail to properly exit through the central discharge oepning 37. The specific relationship of the null point to the upper screen is believed to be relatively minor, but does result in weaker forces tending to impel the material from the center to the periphery of the screen 34, and because of the weaker forces the same can be easily overcome by the sweeping effect of the input fluid.

An exemplary apparatus may have a spacing frame diameter of approximately sixty inches, the screens spaced approximately eighteen inches apart, and employ a two and one-half horsepower motor. An apparatus of this construction employing a Dacron upper screen 34 having a 58 mesh and a stainless steel lower screen 25 having a 64 mesh has been used for separating fluid from a chip board mill which produces paper and relatively dry solids were discharged at spout 40. The weight 8 was approximately twice the weight 9 and the lower weight was adjusted one hundred degrees ahead of the upper weight to ensure that the heavy soggy pulp moved around the periphery of the lower screen 25 at a suitable speed so that it would exit the spout 40 properly without building up on the screen. A usual feed rate is three-hundred and fifty to four-hundred and fifty gallons per minute, although substantially higher surges can be accommodated without flooding. It will be apparent that various other specific constructions can be employed having, for example, different sizes, screen meshes and so forth to accommodate either lower or much larger feed rates and types of feed material. Additionally, a self-cleaning screen structure as described in U.S. Patent No. 3,366,239 can be employed for each of the screens of the separator of the present invention.

If desired, an intermediate deck including another frame like 13 and screen like 34 may be provided. In this case, material also is fed separately to the screen of the intermediate deck by a tangential feed pipe or pipes coupled to the intermediate frame to provide a swirl type feed to the intermediate screen. A suitable feed pipe arrangement is illustrated in FIGURE 3 of applicant's copending application Ser. No. 673,437, filed Oct. 6, 1967, the disclosure of which is incorporated herein by reference. Alternatively, or in addition, another screen like 25 may be provided above the screen 25 with an underlying pan like 38, but inverted from the position shown to essentially provide a feed funnel such that material passing through this additional screen is fed through the opening in this latter pan to the center of screen 25. Thus, a four deck separator can be provided, a three deck separator with an intermediate screen like 34 or like 25, or a two deck separator as shown in FIGURE 1a.

What is claimed is:
1. A vibratory separator comprising
a housing,
a first substantially planar screen secured to said housing, said housing having discharge means underlying said first screen,
vibratory means coupled with said housing for vibrating said housing, said vibratory means including a rotary power source with an eccentric weight, said weight being adjusted to cause material on said first screen to move outwardly from the center thereof toward the periphery thereof,
a second substantially planar screen secured to said housing and mounted above said first screen, said second screen having a relatively small central discharge opening therein for allowing material which fails to pass through said second screen to discharge to the central portion of said first screen, said housing having a discharge pan mounted below said second screen for discharging material which passes through second screen, and
feed means mounted above said second screen for feeding material to be separated to the periphery of said second screen in a generally tangential fashion and for causing a sweeping movement of material from said feed means toward the center of said second screen.

2. A separator as in claim 1 wherein
said feed means includes a plurality of spout members communicating with a material feed pipe, said spout members having openings arranged near the periphery of said second screen for feeding material to the periphery of said second screen.

3. A vibratory separator comprising
a housing,
a first substantially planar screen secured to said housing, said housing having discharge means underlying said first screen,
vibratory means coupled with said housing for vibrating said housing, said vibratory means including a rotary power source with an eccentric weight, said weight being adjusted to cause material on said first screen to move outwardly from the center thereof toward the periphery thereof,
a second substantially planar screen for receiving material to be separated, said second screen being secured to said housing above said first screen and having a relatively small central discharge opening therein for allowing oversize material to pass through said discharge opening to the central portion of said first screen,
a discharge pan mounted below said second screen for receiving and discharging undersized material passing through said second screen, said discharge pan having a central opening therein through which material passing through said discharge opening in said second screen may pass to said central portion of said first screen, and
feed means mounted above said second screen for feeding material to be separated to the periphery of the second screen in a generally tangential fashion and for causing the material to move toward the center of said second screen.

4. A separator as in claim 3 wherein
said feed means includes a plurality of spout members communicating with a material feed pipe, said spout members having openings arranged near the periphery of said second screen for feeding material to the periphery of said second screen.

5. A vibratory separator for separating solids and liquids of a feed material comprising
a housing,
a first substantially planar screen secured to said housing, said housing having a discharge means underlying said first screen for discharging liquid passing through said first screen,
vibratory means coupled with said housing for vibrating said housing and said first screen, said vibratory means including a rotary power source and an eccentric weight, said weight being adjusted to cause material on said first screen to move outwardly from the center thereof toward the periphery thereof,
a second substantially planar screen for receiving said feed material to be separated, said second screen being secured to said housing above said first screen and having a relatively small central discharge opening therein for allowing material which does not pass through said second screen to pass through said discharge opening to the central portion of said first screen,
a discharge pan mounted below said second screen for receiving and discharging liquid passing through said second screen, said discharge pan having a central opening therein through which said material passing through said discharge opening in said second screen may pass to said central portion of said first screen,
said housing having a discharge opening for discharging solids which do not pass through said first screen, and
feed means mounted above said second screen for feeding material to be separated to the periphery of said second screen in a generally tangential fashion and for causing the material to move toward the center of said second screen, said feed means including a plurality of spout members communicating with a material feed member, each of said spout members having an opening arranged near the periphery of said second screen and disposed to feed said material in a generally tangential and sweeping fashion toward the center of said second screen.

References Cited

UNITED STATES PATENTS

| | | | |
|---|---|---|---|
| 1,888,636 | 11/1932 | O'Toole | 209—275 X |
| 2,777,578 | 1/1957 | Miller | 209—315 X |
| 2,828,013 | 3/1958 | Hurst | 209—366.5 X |
| 2,992,740 | 7/1961 | Phippen | 209—316 |
| 3,421,623 | 1/1969 | McKibber | 209—240 |

FOREIGN PATENTS 13,593    6/1906    Great Britain.

HARRY B. THORNTON, Primary Examiner
ROBERT HALPER, Assistant Examiner

U.S. Cl. X.R.
209—316, 332